United States Patent [19]

Santos

[11] Patent Number: 5,374,035
[45] Date of Patent: Dec. 20, 1994

[54] WINCH WITH POWER TRAIN, MANUAL OPERATION OPTION, AND PARTICULAR BRAKE ASSEMBLY

[76] Inventor: Jose C. Santos, 28 Rayo Dr., Shelton, Conn. 06484

[21] Appl. No.: 70,520

[22] Filed: Jun. 3, 1993

[51] Int. Cl.$^5$ .................... B66D 1/14; B66D 1/20; B66D 5/14
[52] U.S. Cl. .................... 254/339; 254/323; 254/346; 254/358; 254/362; 254/378
[58] Field of Search ............ 254/362, 323, 339, 346, 254/356, 358, 375, 378

[56] References Cited

U.S. PATENT DOCUMENTS

| | | | |
|---|---|---|---|
| 2,233,798 | 3/1941 | Robins | 254/358 X |
| 2,374,450 | 4/1945 | Nelles | 254/339 X |
| 2,411,038 | 11/1946 | Hetteen | 254/356 |
| 3,051,447 | 8/1962 | Ahlbin | 254/362 X |
| 4,215,850 | 8/1980 | Haase et al. | 254/339 X |
| 4,236,052 | 11/1980 | Haase | 200/51.09 |
| 4,334,670 | 6/1982 | Kawabe | |
| 4,545,567 | 10/1985 | Telford et al. | |
| 4,553,738 | 11/1985 | Plummer et al. | 254/358 |
| 4,556,199 | 12/1985 | Dansie et al. | |
| 4,588,167 | 5/1986 | Finzel | |
| 4,667,933 | 5/1987 | Frommherz | |
| 4,717,005 | 1/1988 | Jones | |
| 4,754,825 | 7/1988 | Scheffer | 254/358 X |

FOREIGN PATENT DOCUMENTS

| | | | |
|---|---|---|---|
| 4-72297 | 3/1992 | Japan | 254/378 |
| 518272 | 2/1955 | Switzerland | 254/378 |
| 188643 | 11/1966 | U.S.S.R. | 254/378 |

OTHER PUBLICATIONS

Owners Manual and drawing of model LCW of Haulamatic winch; admittted prior art.
"Strongarm" electric winch owners manual, Dutton-Lainson Company, 1991.
"Powerwinch" owners manual, Apr., 1992.

Primary Examiner—Stanley N. Gilreath
Assistant Examiner—Michael R. Mansen
Attorney, Agent, or Firm—Nixon & Vanderhye

[57] ABSTRACT

A winch includes a reversible electrical motor with output shaft which drives a drum through a drive mechanism with multiple sprockets and gears to take up and let out a cable. The output shaft is connected through a one-way bearing to a brake hub. The brake lining on a brake arm is spring biased into engagement with the hub and prevents reverse rotation of the output shaft unless an electrical switch actuator is moved to a reverse position, camming the brake arm out of braking relationship with the hub. The drive mechanism may also be powered manually in the forward direction. If free-wheeling of the drum is desired, a knob is rotated to disconnect a clutch in the drive mechanism.

20 Claims, 4 Drawing Sheets

WINCH WITH POWER TRAIN, MANUAL OPERATION OPTION, AND PARTICULAR BRAKE ASSEMBLY

BACKGROUND AND SUMMARY OF THE INVENTION

It is desirable to utilize an electrical winch for taking up many different loads. Winches are particularly desirable for pulling boats out of the water, for example onto a trailer, and for letting a boat off of a trailer into the water. It is desirable that such winches be powered by a twelve volt battery, which typically will be associated with the vehicle pulling the trailer, and the winches must be also capable of manual operation, and must assist in positively preventing the load (boat) from moving off of the trailer once the cable connected to the load is taken up.

According to the present invention a winch assembly is provided which is useful for many different purposes, but is particularly useful in association with boat trailers. The winch has a reversible electric motor which is readily powered to take up the cable, but is braked by an advantageous braking mechanism in a manner that positively prevents the cable from playing out once the load has been taken up. However when it is desired to let out the cable electrically, simply by moving the switch actuator for energizing the motor the braking mechanism is deactivated, allowing control of let-off of the cable connected to the load (boat). The cable can also be taken up manually without having to disconnect the motor from the drive mechanism for taking up the winch drum, and when there is no load on the cable and it is desired to let the drum "free wheel" to facilitate connecting of the cable to the load, a clutch may be deactivated by a readily accessible knob.

According to one aspect of the present invention a winch assembly is provided comprising the following elements: A drum rotatable about a first axis adapted to be connected by a cable to a load. A reversible electric motor having an output shaft. Means for power rotating the drum mounted on a drum shaft about the first axis either clockwise or counter clockwise in response to power supplied from the motor, including an electrical switch for connecting the motor to a source of electrical power. The switch includes an actuator and having off, forward, and reverse positions corresponding to an off condition, and forward and reverse rotation directions, respectively, of the output shaft. Braking means for braking the motor output shaft to prevent movement thereof at least in the reverse direction when the switch is in the off position. And, means for mechanically deactivating the braking means when the switch is in the reverse position, the means comprising an extension of the switch actuator.

The power rotating means may comprise: A first sprocket connected to the motor output shaft, a second sprocket which spins on the drum shaft, and a chain extending between the sprockets; a first gear connected to and rotatable with the second sprocket; a drive gear meshing with the first gear and mounted on a second shaft; a second gear mounted on the second shaft; an idler gear meshing with the second gear and mounted on an idler shaft; a third gear mounted on the idler shaft; and a fourth gear rigidly connected to the drum, and meshed with the third gear so that the motor drives the drum through (in sequence) the first sprocket, chain, second sprocket, first gear, drive gear, second gear, idler gear, third gear and fourth gear.

The braking means comprises a brake arm with a brake lining engageable with a brake hub of a one way bearing assembly on the output shaft which, when braked by the brake arm and lining, allows forward rotation of the output shaft but not reverse rotation thereof; and a spring biasing the brake lining into engagement with the one way bearing assembly hub.

The brake arm is stationarily mounted at a first end thereof on a first side of the one way bearing assembly, and a second end thereof is engageable by the switch actuator and is on a second side of the one way bearing assembly opposite the first side. The brake spring (e.g. a coil tension spring) engages the brake arm adjacent the second end thereof, and the brake lining engages the one way bearing assembly over an arc of more than 90°.

The means for power rotating the drum may also include a clutch, and means for manually deactivating the clutch so that the drum may free-wheel, not being operatively connected to the motor output shaft. Further, there preferably also is provided means for manually rotating the drum about the first axis independent of the motor in the forward rotation direction to wind up a cable thereon to pull a load.

It is the primary object of the present invention to provide a simple yet effective winch assembly, particularly useful for marine applications, which has positive braking action and good versatility. This and other objects of the invention will become clear from an inspection of the detailed description of the invention, and from the appended claims.

DETAILED DESCRIPTION OF THE DRAWINGS

Figure 1:
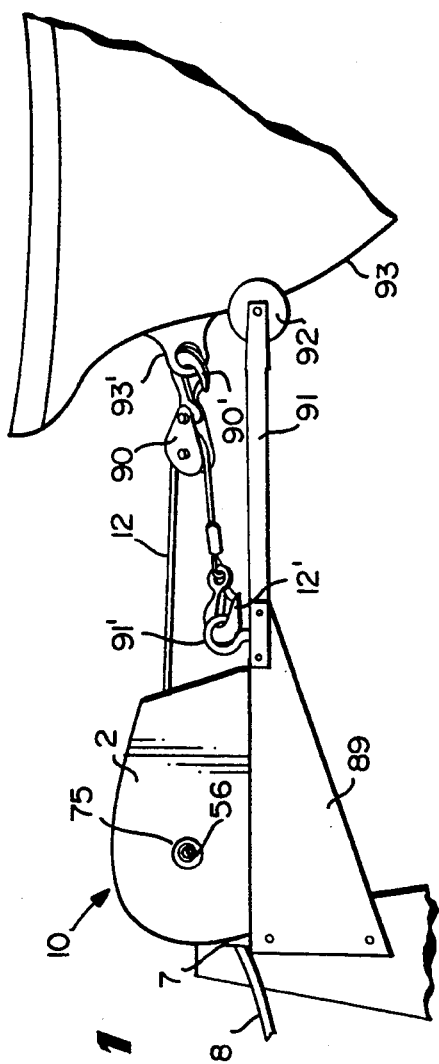
FIG. 1 is a side schematic view illustrating use of a winch assembly according to the present invention for pulling a boat onto a trailer, and holding it there.

The reference numerals in the drawings refer to elements each having a description as follows:
1 Frame
2 Cover (low profile, angled front)
3 Cover screw
4 Frame spacer (short)

Figure 2:
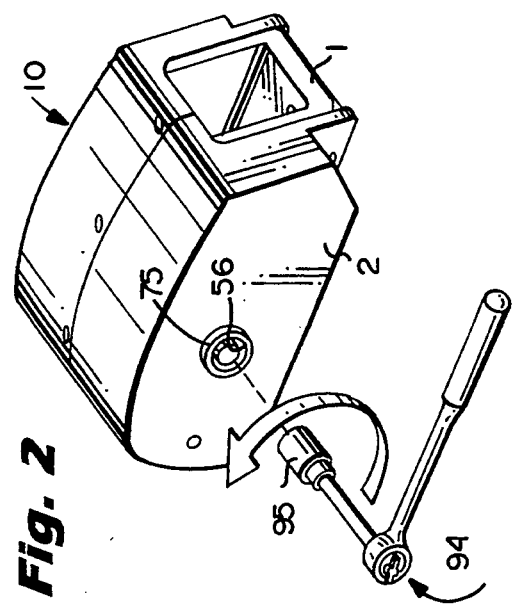
FIG. 2 is a top perspective view of the winch assembly of FIG. 1 showing a manual hand crank in association therewith.

5 Frame spacer (long)
6 Frame spacer screw
7 Plug
8 Wiring harness assembly
9 Circuit breaker assembly
10 Winch assembly
11 Lanyard cord
12 Cable assembly
12' Cable snap
13 Stop sleeve
14 Stop collar screw
15 Stop collar
16 Drum shaft
16' Threaded end of drum shaft
17 Thrust washer
18 Thrust bearing
19 Sprocket hub
20 Sprocket hub bearing
21 60T sprocket (second sprocket)
22 Clutch lining
23 Clutch gear bearing
24 Clutch plate
25 Clutch gear (first gear)
26 Knob
27 Acorn nut
28 Chain assembly
29 Brake spring screw
30 Switch fastening screw
31 Drum spring
32 Pop Rivet
33 Drum spacing washer
34 Drum bearing
35 Drum
36 Motor
36' Motor support
37 Nut
38 Spring Pin
39 Lock Washer
40 Nut
41 Motor spacer
42 Motor sprocket
43 Brake hub bearing
44 Brake hub
45 ¼ retaining ring
46 Brake spring
47 Brake arm
47' Slot in brake arm
47" Cam portion of brake arm 47
48 Brake lining
49 Motor screws
50 Motor jumper (black)
51 Electrical switch
52 Switch actuator extension screw
53 Switch actuator extension
54 Socket jumper (red)
55 Electrical socket
56 Manual drive nut
56' Second shaft nut
57 Drive gear
58 Second shaft
59 Second shaft spacer A
60 Idler and second shaft bearings
61 Second shaft spacer B
62 Second shaft bearing
63, 63' Pinion gears (second, third gears)
64 Cranking nut
65 Socket jumper (black)
66 Idler gear
67 Spacing washer
68 Idler shaft bearing
69 Motor jumper (red)
70 Idler shaft spacer
71 Idler shaft
72½ retaining ring
73 Drum end disc
74 Drum drive gear (fourth gear)
75 Opening for manual drive nut
76 Hooked end of brake spring
77 Anchored end of brake arm
78 Free (slotted) end of brake arm
79 Cut out for motor support
80 Cut out for electrical switch
81 Switch shaft
82 Switch actuator (handle)
83 Opening for drum shaft
84 Twelve volt battery
85 Battery positive terminal
86 Battery negative terminal
87 Opening for second shaft
88 Motor output shaft
89 Trailer winch support
90 Pulley block assembly
90' Pulley block snap
91 Support arm
91' Support arm eye
92 Support arm roller
93 Boat bow
93' Boat bow eye
94 Manual crank (wrench)
95 Crank (wrench) socket
96 Switch shaft cover opening
97 Clutch knob cover opening FIG. 1 shows the winch assembly 10 mounted on a boat trailer support 89, with the cable 12 wrapped around the pulley assembly 90 and the cable snap 12' received by the mounting eye 91' while the pulley snap 90' is received in the bow eye 93' FIG. 1 shows the boat bow 93 in the position to which it has been pulled by rotating the drives for the winch assembly 10 in the forward direction (the direction of the arrow in FIG. 2), to take up cable 12 on drum 35. This may be done electrically or manually.

Electrical operation of the winch assembly 10 to pull the bow 93 to the position illustrated in FIG. 1 (e.g. from the water) is as follows: The switch actuator (handle) 82, mounted on the shaft 81 extending through opening 96 in cover 2, and accessible outside of the cover 2, is rotated counter clockwise ("forward"). During counter clockwise rotation, the actuator extension 53 mounted with the handle 82 on the switch shaft 81 moves in the slot 47' in the free end 78 of the brake arm 47. The switch shaft 81 is rotated to supply power to the reversible motor 36 to rotate the output shaft 88 thereof counter clockwise. Counter clockwise ("forward") of shaft 88 drives the first sprocket 42 on the motor output shaft 88, and through the chain 28 the second sprocket 21 mounted on the same shaft 16 as the drum 35 to which the cable 12 is connected, although the drum 35 and the sprocket 21 move independently of each other on the drum shaft 16.

Assuming that the knob 26 has been tightened in screw threaded engagement with the screw threaded end 16' of the drum shaft 16 so that the clutch plate 24 and clutch lining 22 are in operative engagement with each, rotation of the second sprocket 21 effects rotation of the clutch plate 24 and the first gear 25 rigidly connected thereto. The gear 25 meshes with the drive gear 57 mounted on second shaft 58, rotating the shaft 58 and in turn rotating the second, pinion, gear 63 also mounted thereon. The teeth of the gear 63 mesh with the teeth of the idler gear 66 on the idler shaft 71, causing the idler shaft 71 to rotate, as well as the third, pinion, gear 63' mounted thereon. The teeth of the gear 63' mesh with the teeth of the fourth, drum, gear 74 which is rigidly connected to the drum 35, thereby resulting in rotation of the drum 35 to take up the cable 12 thereon.

Counter clockwise ("forward") rotation the shaft 88 is allowed even though the brake spring 46 biases the brake lining 48 (extending over more than about a 90° arc over the brake hub 44) because the one way bearing 43 allows relative movements between the shaft 88 to which it is connected, and the hub 44 in the counter clockwise direction. However the one way bearing 43—which may be a model RC-040708 bearing available from the Torrington Company of New Britain, Conn.—does not allow rotation between the shaft 88 and the hub 44 in the clockwise ("reverse") direction. Therefore, once the power to the motor 36 is disconnected by moving the switch actuator 82 to the "off" position, so that the contacts within the switch 51 are not completed, the cable 12 cannot play-out; that is the boat bow 93 is essentially locked in the position illustrated in FIG. 1, the brake lining 48 on the brake arm 47 being biased into contact with the hub 44 by the spring 46 so that hub 44, bearing 43, and shaft 88 cannot rotate.

Figure 4:
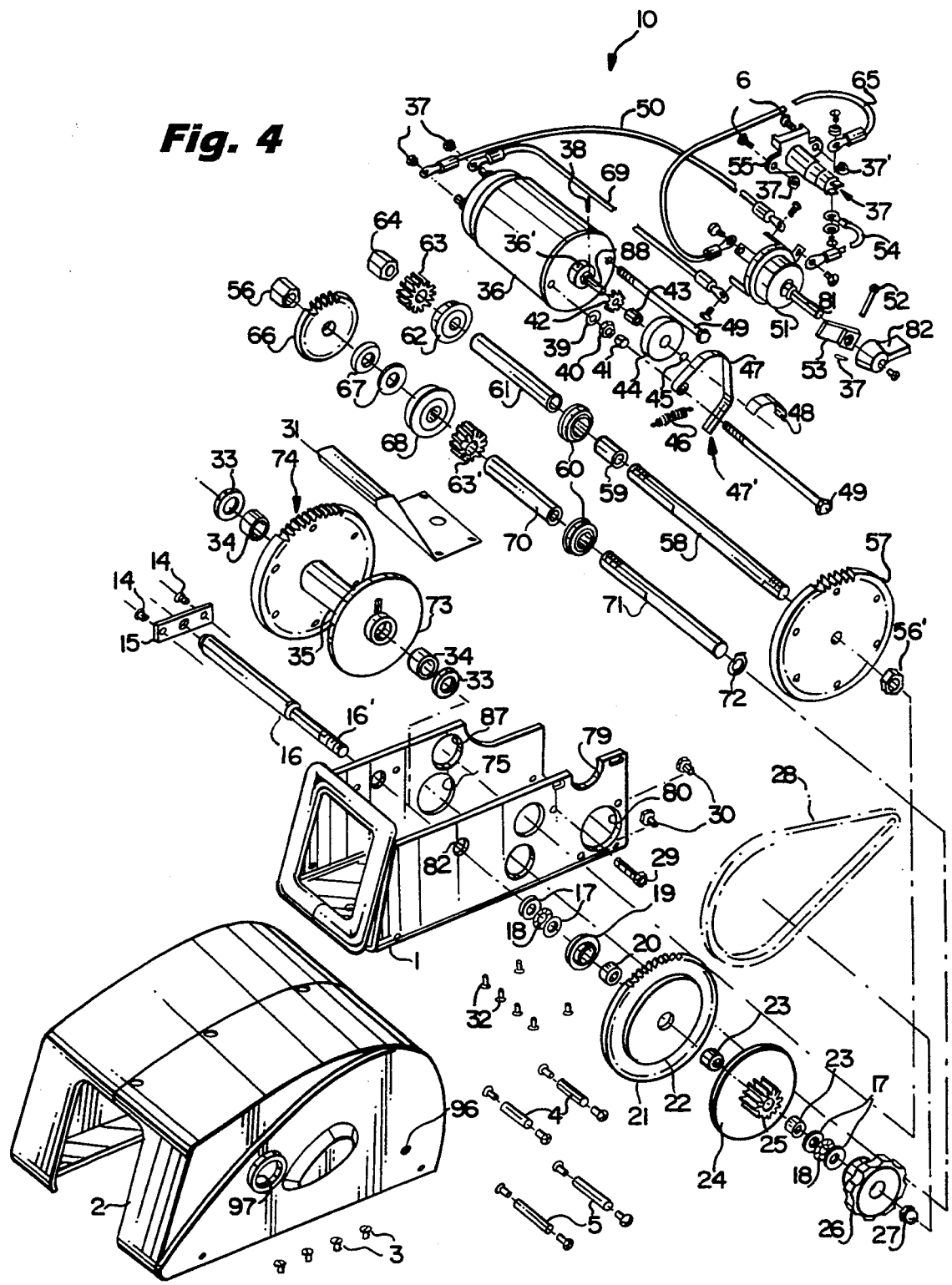
FIG. 4 is an exploded perspective view of all of the components of the winch assembly of FIGS. 1 and 2, and also illustrating accessories utilized therewith.
Figure 5:
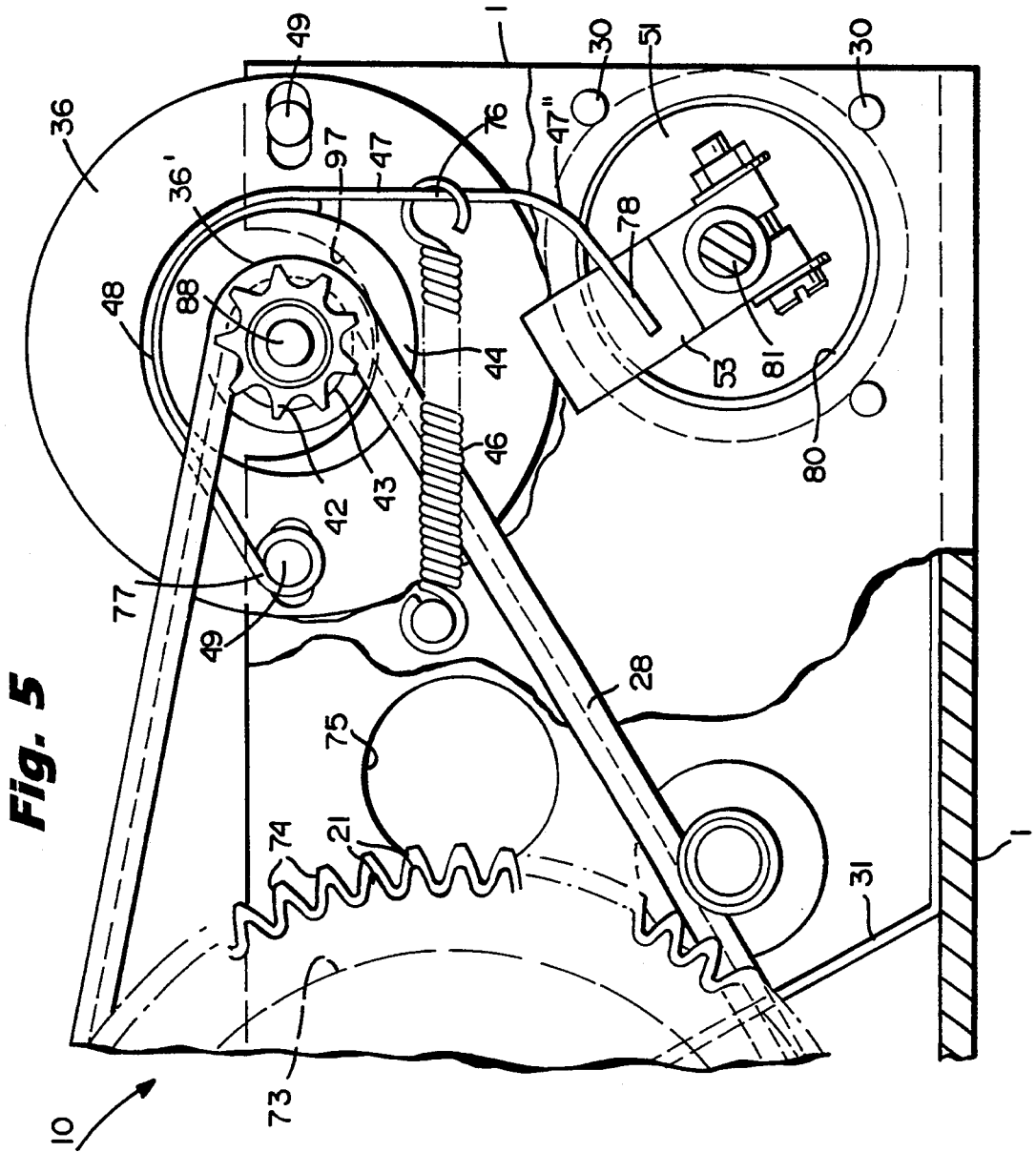
FIG. 5 is a side detail view, partly in cross-section and partly in elevation, with parts of the frame and all of the cover cut away for clarity of illustration, of the particular motor, braking means, and switch according to the present invention.
Figure 6:
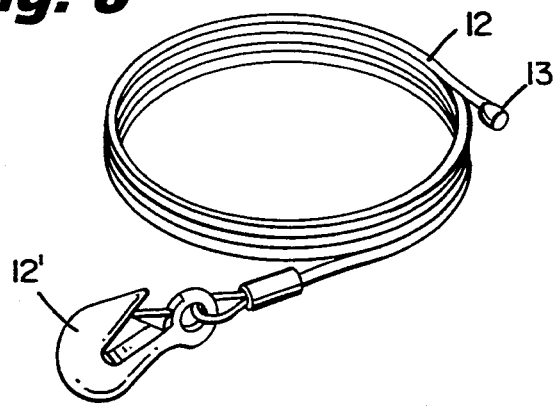
FIG. 6 is a perspective view of an accessory cable assembly.
Figure 7:
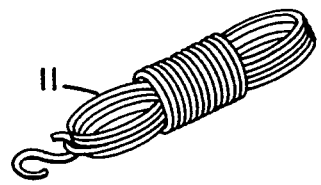
FIG. 7 is a perspective view of an accessory lanyard cord.
Figure 8:
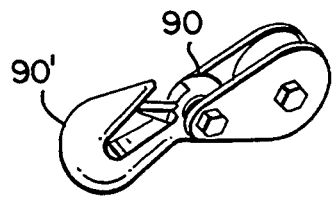
FIG. 8 is a perspective view of an accessory pulley block assembly.
Figure 9:
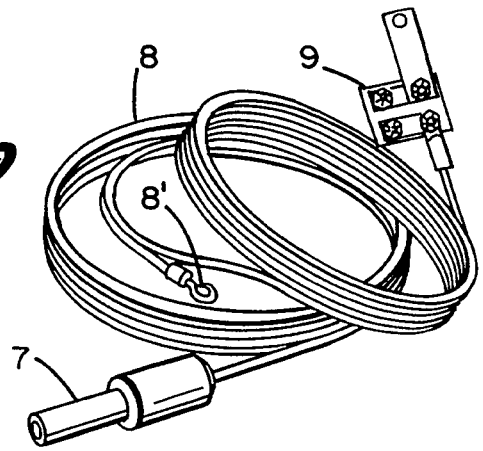
FIG. 9 is a perspective view of an accessory wiring harness assembly.

The motor 36 is mounted to the near side wall of the frame 1 (as seen in FIG. 4), with the motor support 36' received by the frame cut out 79, by the motor screws 49. FIG. 5 is drawn illustrating both the sprocket 42 and the brake hub 44, both of which are outside of the frame 1 side wall but within the cover 2, are illustrated in solid line in FIG. 5 for clarity, however since the sprocket 42 is behind the hub 44 so it would not normally be seen in the side view of FIG. 5.

Figure 3:
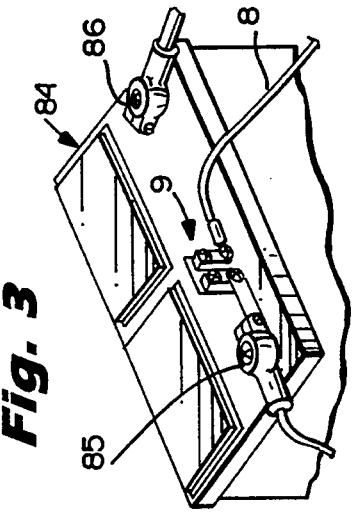
FIG. 3 is a top perspective partial view of a twelve volt battery shown connected to a wiring harness for the winch assembly of FIGS. 1 and 2.

The motor 36 is powered by the battery 84 (see FIG. 3), which typically is a twelve volt battery of the vehicle towing the trailer on which the winch assembly mount 89 is provided. The motor 36 is connected by the wires 50, 69 to the switch 51, which in turn is connected by the wires 54, 65 to the socket 55. The socket 55 receives the plug 7, connected by the wiring harness 8 to the positive terminal 85 of the battery 84 through the circuit breakers 9 (see FIG. 3), with the wiring harness termination 8' (see FIG. 4) connected to ground.

The cable 12, lanyard cord 11, harness 8, and pulley block assembly 90 are accessories that may be used with the winch assembly 10 to facilitate the performance of functions that winches are commonly used for.

It is also possible to take up the cable 12 (that is rotate the drum 35 in the "forward" direction) manually. Manual take-up of the cable 12 is provided by placing the socket 95 of the manual to (socket wrench) 94 (see FIG. 2) over the manual drive nut 56. Counter clockwise rotation of the nut 56, at the end of the second shaft 71, rotates the gear 63' mounted thereon, which engages the gear 74 connected to the drum 35, causing drum 35 to rotate, taking up the cable 12. This rotation is allowed by the one way bearing 43. However, clockwise rotation of the nut 56 and the shaft 71 to which it is connected is substantially prevented by the brake lining 48 engaging the hub 44 under the influence of the spring 46.

When it is desired to let out the cable 12 electrically, this is done by moving the handle 82 to the reverse position, rotating the shaft 81 clockwise as illustrated in FIGS. 4 and 5. Since the actuator extension 53 rotates with the shaft 81, it moves through the slot 47' into engagement with the cam portion 47" (see FIGS. 4 and 5) of the brake arm 47, pivoting the brake arm 47 against the bias of spring 46 so that the lining 48 does not engage (at least does not tightly engage) the hub 44, allowing the shaft 88 and hub 44 to be driven in the clockwise direction, which ultimately—through the sprocket and gear arrangement described above—rotates the drum 35 to let out the cable 12, the boat or other load moving under its weight away from the winch assembly 10 but controlled in speed by the rotation of the output shaft 88 of the motor 36.

Under some circumstances, such as when it is desired to pull the cable 12 by hand to initially connect up the pulley assembly 90' to the bow eye 93', and the snap 12' at the end of the cable 12 to the mounting arm eye 91' (that is when no load is on the cable 12), the knob 26 (which extends through opening 97 in cover 2) is actuated. By unscrewing the knob 26 slightly from the screw threaded end 16' of the drum shaft 16, the clutch plate 24 and clutch lining 22 are disengaged. This allows free wheeling of the drum 35. Once the connection between the pulley snap 90' and cable snap 12' have been made, the knob 26 is tightened to again press the clutch plate 24 into engagement with the clutch lining 22 on sprocket 21.

It will thus be seen that according to the present invention a simple yet effective electrical winch assembly is provided, one that positively precludes play-out of the cable by braking the motor shaft, allows manual cranking to take up the cable, and allows free wheeling by separate manual detachment of a clutch. While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A winch comprising:

a drum rotatable about a first axis adapted to be connected by a cable to a load;

a reversible electric motor having an output shaft;

a brake hub;

a one-way bearing mounted on said output shaft between said brake hub and said output shaft;

means for power rotating said drum mounted on a drum shaft about said first axis either clockwise or counter clockwise in response to power supplied from said motor, including an electrical switch for connecting said motor to a source of electrical power, said switch including an actuator and having off, forward, and reverse positions corresponding to an off condition, and forward and reverse rotation directions, respectively, of said output shaft;

braking means for braking said motor output shaft to prevent movement thereof at least in said reverse direction when said switch is in said off position, said braking means comprising a brake arm with a brake lining engageable with said brake hub of said one way bearing assembly on said output shaft which, when braked by said brake arm and lining, allows forward rotation of said output shaft but not reverse rotation thereof; and means for mechanically deactivating said braking means when said switch is in said reverse position, said means comprising an extension of said switch actuator.

2. A winch as recited in claim 1 wherein said braking means further comprises a spring biasing said brake lining into engagement with said one way bearing assembly hub.

3. A winch as recited in claim 2 wherein said switch actuator extension includes a cam portion for moving said brake arm against the bias of said spring so that said brake lining moves out of engagement with said one way bearing assembly hub when said actuator is moved to said reverse position.

4. A winch as recited in claim 3 wherein said spring comprises a coil tension spring.

5. A winch as recited in claim 4 wherein said brake arm is stationarily mounted at a first end thereof on a first side of said one way bearing assembly, and wherein a second end thereof is engageable by said switch actuator and is on a second side of said one way bearing assembly opposite said first side, said coil tension spring engaging said brake arm adjacent said second end thereof; and wherein said brake lining engages said brake hub over an arc of more than about 90°.

6. A winch as recited in claim 5 wherein said means for power rotating said drum includes a clutch; and further comprising means for manually deactivating said clutch so that said drum may free-wheel, not being operatively connected to said motor output shaft.

7. A winch as recited in claim 6 wherein said manually deactivating means comprises a knob which is screw mounted on said drum shaft.

8. A winch assembly as recited in claim 5 wherein said brake arm second end has an end slot formed therein, and wherein said actuator extension slides in said slot, so that said actuator extension is freely movable with respect to said brake arm in the forward direction of rotation, but engages and moves said brake arm therewith in the reverse direction of rotation of said switch shaft.

9. A winch as recited in claim 2 wherein said brake arm is stationarily mounted at a first end thereof on a first side of said one way bearing assembly, and wherein a second end thereof is engageable by said switch actuator and is on a second side of said one way bearing assembly opposite said first side, said spring engaging said brake arm adjacent said second end thereof; and wherein said brake lining engages said brake hub over an arc of more than about 90°.

10. A winch as recited in claim 1 wherein said means for power rotating said drum further comprises a first sprocket connected to said output shaft, a second sprocket connected to said drum shaft, and a chain extending between said sprockets.

11. A winch as recited in claim 1 wherein said means for power rotating said drum further comprises: a first sprocket connected to said output shaft, a second sprocket which spins on said drum shaft, and a chain extending between said sprockets; a first gear connected to and rotatable with said second sprocket, a drive gear meshing with said first gear and mounted on a second shaft, a second gear mounted on said second shaft, an idler gear meshing with said second gear and mounted on an idler shaft, a third gear mounted on said idler shaft, and a fourth gear rigidly connected to said drum, and meshed with said third gear so that said motor drives said drum through, in sequence, said first sprocket, chain, second sprocket, first gear, drive gear, second gear, idler gear, third gear and fourth gear.

12. A winch as recited in claim 11 further comprising means for manually rotating said drum about said first axis independent of said motor in said forward rotation direction, to wind up a cable thereon to pull a load, said manually rotating means comprising a drive nut for said idler shaft for receipt of a wrench, forward rotation of said wrench rotating said idler shaft and third gear, and said third gear driving said fourth gear.

13. A winch as recited in claim 11 wherein said second sprocket is connected to said first gear by a clutch, and further comprising means for manually deactivating said clutch so that said drum may free wheel, not being operatively connected to said motor output shaft, said second sprocket being mounted on said drum shaft for rotation independent of the rotation of said drum.

14. A winch as recited in claim 1 wherein said electric motor comprises a twelve volt motor, operable by a twelve volt electrical power source.

15. A winch as recited in claim 1 further comprising means for manually rotating said drum about said first axis independent of said motor in said forward rotation direction to wind up a cable thereon to pull a load.

16. A winch comprising:
a drum rotatable about a first axis adapted to be connected by a cable to a load;
a reversible electric motor having an output shaft;
means for power rotating said drum mounted on a drum shaft about said first axis either clockwise or counter clockwise in response to power supplied from said motor, including an electrical switch for connecting said motor to a source of electrical power, said switch including an actuator and having off, forward, and reverse positions corresponding to an off condition, and forward and reverse rotation directions, respectively, of said output shaft;
braking means for braking said motor output shaft to prevent movement thereof at least in said reverse direction when said switch is in said off position;
means for mechanically deactivating said braking means when said switch is in said reverse position, said means comprising an extension of said switch actuator; and
wherein said means for power rotating said drum further comprises a first sprocket connected to said output shaft, a second sprocket connected to said drum shaft, and a chain extending between said sprockets.

17. A winch as recited in claim 16 wherein said second sprocket spins on said drum shaft, and wherein said means for power rotating said drum further comprises: a first gear connected to and rotatable with said second sprocket, a drive gear meshing with said first gear and mounted on a second shaft, a second gear mounted on said second shaft, an idler gear meshing with said second gear and mounted on an idler shaft, a third gear mounted on said idler shaft, and a fourth gear rigidly connected to said drum, and meshed with said third gear so that said motor drives said drum through, in sequence, said first sprocket, chain, second sprocket, first gear, drive gear, second gear, idler gear, third gear and fourth gear.

18. A winch as recited in claim 17 further comprising means for manually rotating said drum about said first axis independent of said motor in said forward rotation direction, to wind up a cable thereon to pull a load, said manually rotating means comprising a drive nut for said idler shaft for receipt of a wrench, forward rotation of said wrench rotating said idler shaft and third gear, and said third gear driving said fourth gear.

19. A winch as recited in claim 17 wherein said second sprocket is connected to said first gear by a clutch, and further comprising means for manually deactivating said clutch so that said drum may free wheel, not being operatively connected to said motor output shaft, said second sprocket being mounted on said drum shaft for rotation independent of the rotation of said drum.

20. A winch comprising:

a drum rotatable about a first axis adapted to be connected by a cable to a load;

a reversible electric motor having an output shaft;

means for power rotating said drum mounted on a drum shaft about said first axis either clockwise or counter clockwise in response to power supplied from said motor, including an electrical switch for connecting said motor to a source of electrical power, said switch including an actuator and having off, forward, and reverse positions corresponding to an off condition, and forward and reverse rotation directions, respectively, of said output shaft;

braking means for braking said motor output shaft to prevent movement thereof at least in said reverse direction when said switch is in said off position;

means for mechanically deactivating said braking means when said switch is in said reverse position, said means comprising an extension of said switch actuator; and means for manually rotating said drum about said first axis independent of said motor in said forward rotation direction to wind up a cable thereon to pull a load.

* * * * *